United States Patent [19]

Kitayama

[11] Patent Number: 5,418,762
[45] Date of Patent: May 23, 1995

[54] OPTICAL DISK RECORDING DEVICE HAVING A PRE-RECORDING MODE

[75] Inventor: Atsushi Kitayama, Kanagawa, Japan

[73] Assignee: Sony Corporation, Tokyo, Japan

[21] Appl. No.: 161,241

[22] Filed: Dec. 3, 1993

[30] Foreign Application Priority Data

Dec. 9, 1992 [JP] Japan .................. 4-352064

[51] Int. Cl.⁶ .................. G11B 13/04; G11B 7/24
[52] U.S. Cl. .................. 369/13; 369/47; 369/54
[58] Field of Search .......... 369/13, 32, 33, 47, 369/48, 54, 59, 124; 360/8, 27

[56] References Cited

U.S. PATENT DOCUMENTS 5,224,087 6/1993 Maada et al. .................. 369/47

FOREIGN PATENT DOCUMENTS

| | | |
|---|---|---|
| 540164 | 5/1993 | European Pat. Off. .................. 369/13 |
| 544504 | 6/1993 | European Pat. Off. .................. 369/13 |
| 570922 | 11/1993 | European Pat. Off. .................. 359/13 |
| 571191 | 11/1993 | European Pat. Off. .................. 369/13 |
| 58-41453 | 3/1983 | Japan . |
| 60-195753 | 10/1985 | Japan . |
| 5242478 | 9/1993 | Japan .................. 369/13 |

Primary Examiner—Georgia Y. Epps
Assistant Examiner—Tan Dinh
Attorney, Agent, or Firm—Limbach & Limbach; Philip M. Shaw, Jr.

[57] ABSTRACT

A disc recording apparatus in which input digital signal are compressed and temporarily stored in a memory at a first speed and wherein, in response to a user supplied record signal, the compressed data stored in the memory, including compressed data stored in the memory prior to generation of the user supplied record signal, are read out of the memory at a second speed which is higher than the first speed, further encoded and recorded on a disc.

11 Claims, 5 Drawing Sheets

FIG. 1

FIG. 4A  A FEW MINUTES AFTER PRERECORD KEY 19 IS OPERATED

FIG. 4B

FIG. 4C  RECORD KEY 16 OPERATED

FIG. 5

OPTICAL DISK RECORDING DEVICE HAVING A PRE-RECORDING MODE

BACKGROUND

1. Field of the Invention

The present invention relates to a disc recording method and a disc recording apparatus whereby audio data is recorded and reproduced. More particularly, the invention relates to a method and an apparatus for recording data on the disc, the apparatus having a memory in which to store temporarily the data preparatory to recording onto the disc.

2. Background of the Invention

In general, audio signal recording apparatuses such as tape recorders do not start their actual recording operation at exactly the time when they are given a recording start instruction, illustratively by operation of a recording button. This is because it takes time for the mechanisms of the recording apparatus to start up or for them to switch from another mode to recording mode. That is, the recording of data onto a storage medium actually begins after the delay of a certain period of time. In other words, no audio signal can be recorded during that delay time onto the storage medium, with the result that the initial part of a conversation or other sound sequence to be recorded fails to register on the storage medium.

Take, for example, the tape recorder for conference recording purposes disclosed in Japanese Patent Laid-Open No. SHO/60-195753 (1985). This tape recorder is designed to be inactive while detecting no sound and to act only when recording the sound it detects. This kind of tape recorder is incapable of recording an initial part of a sound sequence due to the time of delay from detection of the sound sequence until the actual start of the mechanisms for recording.

One solution to the above deficiency is proposed in the form of a recording apparatus disclosed in Japanese Patent Laid-Open No. SHO/58-41453 (1983). This recording apparatus comprises an FIFO memory with a recording capacity large enough to accommodate that initial part of a sound sequence which corresponds to a predetermined start-up time of the apparatus mechanisms. That is, the FIFO memory stores audio data equivalent to the start-up time, the audio data being handled through the memory as part of the actual data to be recorded.

One disadvantage of the above recording apparatus is the inclusion of the FIFO memory that is provided specifically to prevent omission of the initial part of the sound sequence. The memory is expensive and requires space in the apparatus which in turn needs to be bulkier than other models.

When listeners of a radio broadcast want to record a program from the radio, they generally operate the recording button of the recording apparatus while listening to the program broadcast. In such cases, it often happens that the listeners realize that a particular program or a portion of it they have just heard should have been recorded. By the time they realize what they have missed, the program has already been broadcast and is generally irretrievable. If it is desired to record that chronologically preceding part of broadcast upon subsequent recognition thereof, the recording apparatus needs to be equipped with a FIFO memory of a relatively large capacity to store a certain stream of broadcast. However, the above-mentioned conventional recording apparatus fails to foresee such eventualities and has a FIFO memory only large enough to allow for the time of mechanical delay from execution of a recording start instruction until the actual start of the recording operation. Whereas radio listeners have the above-mentioned need to record desired programs intact from the beginning, the conventional recording apparatus fails to meet the requirement despite its FIFO memory.

Furthermore, installing a large capacity memory, which is expensive and bulky, is not a practical solution to the problem.

SUMMARY OF THE INVENTION

It is, therefore, an object of the present invention to provide a disc recording apparatus which resolves the above-mentioned problem.

It is another object of the present invention to provide a novel disc recording method.

In carrying out the invention and according to one aspect thereof, there is provided a disc recording apparatus comprising an encoder, a memory, a head device and a controller. The encoder subjects an input digital signal to data compression. The memory accommodates temporarily the data that is output by the encoder. The head device records onto the disc the data read from the memory. The controller controls the memory and the head device in operation. The controller controls the operation of reading data from the memory in such a manner that the speed at which data is read from the memory is kept higher than the speed at which data is written data to the memory after output from the encoder. When a prerecording mode is established, the controller, before having the head device start recording data onto the disc, always writes to the memory the digital data that is input over a period of time starting from a given point in time. The period of time corresponds to the storage capacity of the memory. When having the head device start recording data onto the disc in accordance with an actually input recording start instruction, the controller reads data from the memory starting from a point in time chronologically preceding the point in time at which the recording start instruction is input. According to another aspect of the invention, there is provided a disc recording method including the steps of: subjecting input digital data to data compression; writing temporarily the compressed data to a memory; when prerecording mode is established and before a head device starts recording data onto the disc, always writing to the memory in compressed form the digital data that is input over a period of time starting from a given point in time, the period of time corresponding to the storage capacity of the memory; when the head device starts recording data onto the disc in accordance with an actually input recording start instruction, starting to read data from the memory at a speed higher than the speed at which to write compressed data to the memory, the reading of data from the memory being started earlier by a predetermined time than the point in time at which the recording start instruction is input; and feeding the head device with the data read from the memory for recording onto the disc.

As outlined above and according to the disc recording apparatus or method of the invention, the input data is compressed and stored temporarily in a memory before being recorded onto the disc. Through retrieval from the temporary memory, the data is recorded onto the disc starting from the time previous to the actual start of recording operation. This eliminates the possibility of failing to record the initial part of the sound sequence to be recorded.

Other objects, features and advantages of the present invention will become apparent in the following specification and accompanying drawings.

BRIEF DESCRIPTION OF THE DRAWINGS

The invention will be more readily understood with reference to the accompanying drawings, wherein:

FIGS. 4A through 4C are schematic views illustrating how the writing and the reading of data to and from the memory of the inventive apparatus are controlled.

DESCRIPTION OF THE INVENTION

Figure 1:
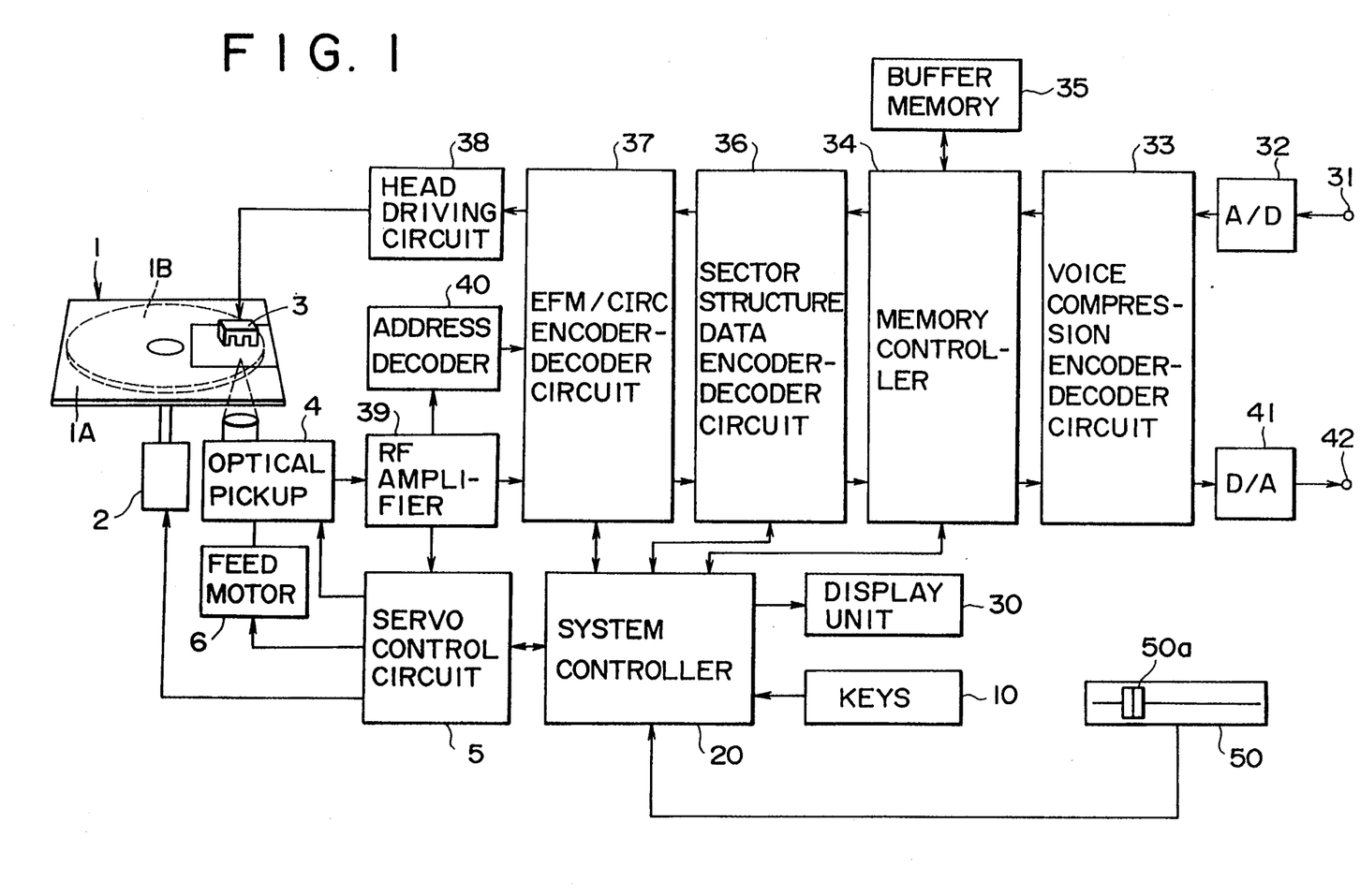
FIG. 1 is a principal block diagram of a disc recording and reproducing apparatus embodying the present invention.

Preferred embodiments of the invention as it is applied to an optical disc recording and reproducing apparatus will now be described in detail with reference to the accompanying drawings. FIG. 1 is a principal block diagram of the disc recording and reproducing apparatus embodying the present invention. In FIG. 1, reference numeral 1 is a disc cartridge that includes a cartridge proper 1A containing an optical disc 1B which is about 64 mm in diameter. There are three kinds of optical disc 1B: a read-only optical disc, a magneto-optical disc, and a hybrid disc that mixes a read-only area with a writable area. The description that follows presupposes that the optical disc 1B is a magneto-optical disc.

The optical disc 1B has spiral pre-grooves formed thereon for light beam tracking control. With this embodiment, the pre-grooves are recorded in frequency-modulated fashion based on absolute address data. Thus the pre-grooves on the optical disc 1B wobble in the radial direction in accordance with the absolute address data given.

The optical disc 1B includes an optically transparent disc substrate, a recording layer and a protective film. The disc substrate is composed illustratively of an optically transparent synthetic resin such as polycarbonate. The above-mentioned wobbled pre-grooves are formed beforehand on one side surface of the disc substrate. The recording layer is made of an optical recording material such as a perpendicular magnetic recording medium. This recording layer is deposited in the form of a thin film by sputtering or by vacuum evaporation over that side of the disc substrate which has the pre-grooves. Over the recording layer is the protective film made of an ultraviolet-cured resin for protective purposes.

The optical disc 1B has a recording area and an index area. In the recording area, data is recorded along the wobbled pre-grooves. The index area accommodates title and address information. The title information includes the titles of data records, title of the disc and other titular information representing the data stored in the recording area. The address information includes the starting and end addresses and other address-related information about the data recorded on the optical disc. The index area is located radially inside the outer disc portion accommodating the recording area on the optical disc 1B. The index area is read by an optical pickup, to be described later, when the optical disc 1B is loaded in the disc recording and reproducing apparatus and before data is written to the recording area or before record data is read therefrom. The index information thus retrieved is held within a memory area of a system controller, to be described later, or within a dedicated memory area furnished in a buffer memory, to be described later.

The disc cartridge 1 has a shutter, not shown, which is slidably mounted on the cartridge main body 1A of the disc cartridge 1. The shutter is moved between a first position and a second position. When the disc cartridge 1 is loaded in the disc recording and reproducing apparatus, the shutter is moved to the first position that an opening formed on the cartridge main body 1A is opened. When the disc cartridge 1 is ejected from the disc recording and reproducing apparatus, the shutter is moved to the second position that the opening of the cartridge main body 1A is closed.

Reference numeral 2 is a spindle motor that rotates the optical disc 1B at a constant linear velocity (CLV). At an edge of the rotating shaft of the spindle motor 2 is a turntable, not shown. On this turntable, the optical disc 1B of the optical cartridge 1 is placed when the cartridge 1 is loaded in the disc recording and reproducing apparatus.

Reference numeral 3 is a magnetic head located opposite to one of two openings of the disc cartridge 1. In operation, the magnetic head 3 generates a vertical magnetic field modulated in accordance with the record data fed from a head driving circuit, to be described later. The vertical magnetic field thus generated is applied to the recording layer on the optical disc 1B via the protective film.

Reference numeral 4 is an optical pickup located opposite to the magnetic head 3 with the optical disc 1B interposed therebetween. The optical pickup 4 includes a light beam source such as a semiconductor laser device, an objective lens that focuses the light beam from the light source onto the optical disc 1B, a photodetector that receives the light beam reflected by the optical disc 1B, and an optical system associated with these components.

The optical pickup 4 further includes an actuator that drives the objective lens in the focusing and tracking directions. The actuator is supplied with a focusing servo signal and a tracking servo signal from a servo control circuit, to be described later. Under control of the servo control circuit, the actuator drives the objective lens in the focusing and tracking directions in such a manner that the focusing and tracking servo signals received by the actuator will each become zero. The optical pickup 4 and the magnetic head 3 are mechanically connected. When the optical pickup 4 is moved in the radial direction over the optical disc 1B, the magnetic head 3 is also moved in the radial direction over the disc 3. The intensity of the light beam emitted by the optical pickup 4 is controlled by a system controller, to be described later.

Reference numeral 5 is a servo control circuit that is supplied with such error signals such as a focusing error signal and a tracking error signal from an RF amplifier, to be described later. Given the error signals, the servo control circuit 5 in turn generates a focusing servo signal, a tracking servo signal, a spindle servo signal and a feed signal. The focusing servo signal and tracking servo signal are fed to the actuator of the optical, pickup 4, as already mentioned. The spindle servo signal is supplied to the spindle motor 2 so that the motor 2 will turn the optical disc 1B at a constant linear velocity. The feed signal is sent to a feed motor 6. On receiving the feed signal, the feed motor 6 generates a driving force that actuates a feed mechanism, not shown. The feed mechanism moves the optical pickup 4 and magnetic head 3 radially along recording tracks of the optical disc 1B in a recording mode or in a reproducing mode. When the feed motor 6 is supplied with an access signal based on an access instruction generated by a system controller, to be described later, the feed motor 6 causes the optical pickup 4 and the magnetic head 3 to effect a track jump radially over the optical disc 1B.

Figure 2:
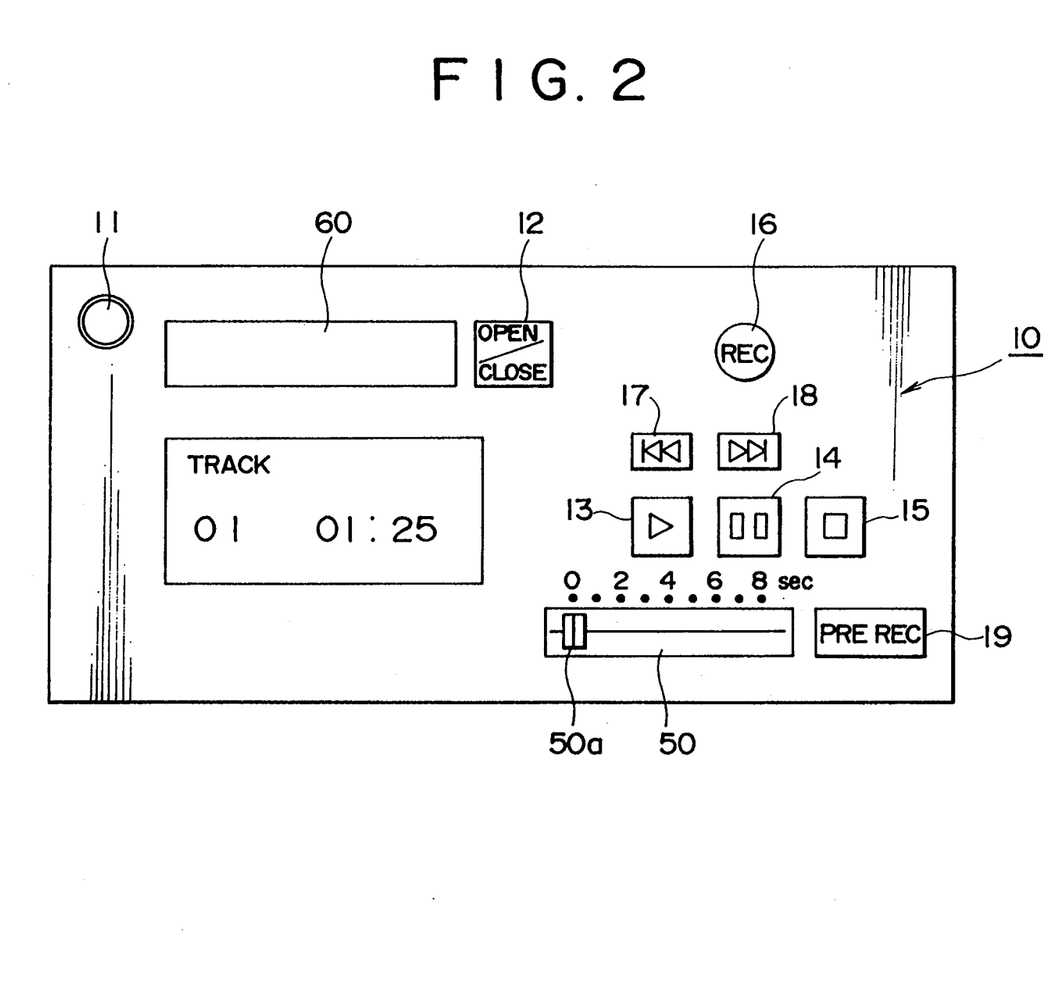
FIG. 2 is a view of a front panel that is part of the disc recording and reproducing apparatus embodying the invention.

Reference numeral 10 is an input unit connected to the system controller, to be described later. As shown in FIG. 2, the input unit 10 is has a plurality of keys. More specifically, the input unit 10 comprises a power key 11, an eject key 12, a playback key 13, a pause key 14, a stop key 15, a record key 16, a fast-forward key 17, a fast-rewind key 18 and a prerecord key 19. The power key 11 turns on and off the power source of the disc recording and reproducing apparatus when operated. The eject key 12 is used to eject the disc cartridge 1 from the apparatus it is loaded in. The playback key 13 starts the reproducing operation of the apparatus when operated. The pause key 14 sets a pause state while the optical disc 1B is being reproduced. Operating the stop key 15 stops the disc recording and reproducing operations of the apparatus. The record key 16 is used to start the recording operation of the apparatus. When operated, the fast-forward key 17 and fast-rewind key 18 forward and rewind fast the reproducing position on the optical disc 1B, respectively, during the reproducing operation. The prerecord key 19 is used to set prerecording mode, to be described later. The a prerecording mode set by the prerecord key 19 is a mode in which data is recorded starting from a point in time earlier than the time when the record key 16 is operated to start the recording operation. To utilize the prerecording mode requires operating the prerecord key 19 before the record key 16.

As shown in FIG. 2, the front panel of the apparatus includes a variable input part 50 that is used to set a prerecording time in prerecording mode, i.e., a period of time in which input data chronologically preceding the present time is recorded. The variable input part 50 may illustratively be a slide rheostat depicted in FIG. 2. Moving the slide lever 50a of the slide rheostat allows the variable input part 50 to set a desired prerecording time. The prerecording time thus established reflects the resistance value of the slide rheostat converted from analog to digital format, the converted value being fed to the system controller. An A/D converter is interposed as needed between the variable input part 50 and the system controller for conversion of the resistance value of the slide rheostat to a-digital signal. If the system controller is constituted by a microcomputer incorporating an A/D converter, the separate A/D converter interposed between the variable input part 50 and the system controller is unnecessary and will be omitted. If the storage capacity of a buffer memory, to be described later, is 4 Mbits, an audio signal chronologically preceding the present time by up to 10 seconds may be recorded. In that case, the prerecording time may be set anywhere between 0 and 10 seconds on the variable input part 50. The prerecording mode will be described later in more detail.

Reference numeral 20 is a system controller constituted by a microcomputer. In accordance with the key operations made on the input unit 10, the system controller 20 generates control signals that are sent to relevant parts of the disc recording and reproducing apparatus for operation control. A display unit 30 is connected to the system controller 20. The display unit 30 may be a liquid crystal display (LCD), a vacuum fluorescent display (VFD) or the like. In keeping with the signal fed from the system controller 20, the display unit 30 displays such information as the total playback time of the optical disc 1B, the elapsed time of the program being reproduced, the remaining time of the currently reproduced program, the total remaining time of the disc, and the track number of the program being reproduced. If the optical disc 1B contains such title information as the disc title and the titles of individual programs stored, these titles are displayed selectively on the display unit 30. If the optical disc 1B includes date information about the dates and times of day at which the disc or individual programs were recorded, this information is also displayed selectively on the display unit 30.

Reference numeral 31 is an input terminal through which analog signals such as an analog audio signal are input. Although FIG. 1 shows a single-channel setup for the sake of visual simplicity, there is usually provided a two-channel (L, R) stereophonic arrangement. The same holds for the description that follows.

An analog input signal that enters the input terminal is sent to an analog-to-digital (A/D) converter 32. The A/D converter 32 digitizes the analog input signal at a sampling frequency of 44.1 kHz with a quantization bit count of 16 bits. The digital signal output from the A/D converter 32 is sent to an audio compression encoder-decoder circuit 33. The audio compression encoder-decoder circuit 33 compresses the received digital signal to about one fifth of the original. The compression technique applied in the audio compression encoder-decoder circuit 33 is a modified DCT (Discrete Cosine Transform).

The digital data output from the audio compression encoder-decoder circuit 33 is forwarded through a memory controller 34 and stored temporarily in a buffer memory 35. The buffer memory 35 is a DRAM (dynamic random access memory) with a storage capacity of 4 Mbits. The memory controller 34 controls the writing and the reading of data to and from the buffer memory 35. In operation, the memory controller 34 writes the digital data from the audio compression encoder-decoder circuit 33 to the buffer memory 35 at a transfer rate of 0.3 Mbits/sec. The digital data in the buffer memory 35 is read therefrom by the memory controller 34 at a transfer rate of 1.41 Mbits/sec.

During recording, the memory controller 34 reads the compressed data successively from the buffer memory 35 at a transfer rate about five times as high as that of writing the data thereto, on the condition that there occurs no track jump over the optical disc 1B as a result of vibration or like disturbance. The data read out from the buffer memory 35 is transferred to a sector structure data encoder-decoder circuit 36.

If a track jump is detected while data is being written to the optical disc 1B, the memory controller 34 stops data transfer to the data encoder-decoder circuit 36 and places the compressed data from the audio compression encoder-decoder circuit 33 into the buffer memory 35. Thereafter, when the recording position, i.e., that position on the disc to which the optical pickup 4 emits the light beam, is corrected, the memory controller 34 resumes data transfer from the buffer memory 35 to the data encoder-decoder circuit 36.

Whether or not a track jump has occurred is detected illustratively using a vibrometer incorporated in the disc recording and reproducing apparatus. A track jump is detected when the vibration detected is judged to be large enough to trigger one. Since the optical disc 1B has absolute address data recorded in its pre-grooves as described, a track jump may alternatively be detected using that data. That is, the absolute address data is read during recording, and the continuity of the decoded address data is monitored by the system controller 20. A discontinuity of the data is interpreted as the occurrence of a track jump. Another alternative is to have the vibrometer output and the absolute address data OR'ed for track jump detection. When a track jump is detected, the system controller 20 controls the optical pickup 4 in such a manner that the output power level of the light beam from the optical pickup 4 is reduced to zero or to a level where recording of data is not available.

The recording position in effect at the time of a track jump is corrected by use of the absolute address data mentioned above. To effect this correction requires that the buffer memory 35 should at least have a storage capacity large enough to accommodate the compressed data corresponding to the period from the time when the track jump occurs until the recording position is corrected. With this embodiment, the buffer memory 35 has the above-mentioned storage capacity of 4 Mbits, which sufficiently meets the above requirement.

During normal recording, the memory controller 34 provides memory control such as to minimize the data stored in the buffer memory 35. That is, when the quantity of data placed in the buffer memory 35 has exceeded a predetermined level, a certain amount of data (e.g., 32 sectors of data, one sector corresponding to one CD-ROM sector or about 2 Kbytes) is read from the buffer memory. This operation is intended to ensure a minimum write space in the memory all the time.

The data encoder-decoder circuit 36 encodes the data read from the buffer memory 35 into the CD-ROM sector structure data. As will be explained later, audio data is recorded and reproduced in units of 32 sectors of data (equivalent to about 0.4 seconds of compressed data, which corresponds to about 2 seconds of the original analog audio signal). The 32-sector audio data is called one cluster hereunder.

The output data from the data encoder-decoder circuit 36 is fed to an EFM/CIRC encoder-decoder circuit 37. The circuit 37 encodes the supplied data with an EFM (Eight to Fourteen Modulation) and a CIRC (Cross Interleave Reed-Solomon Code). The CIRC as the code for error detection and correction of this embodiment is one with its interleave modified to a Compact Disc thereof. The data to be recorded is intermittent data, arranged in units of 32 sectors constituting one cluster of audio data. Each cluster made of 32 sectors is prefixed and suffixed by a total of 4 sectors (called linking sectors which include one sub-data sector) for cluster connection purposes. That is, data is actually recorded to the optical disc 1B in units of 36 sectors.

The record data thus prepared is supplied to the magnetic head 3 via a head driving circuit 38. For recording, the magnetic field modulated as per the prepared record data is applied to the optical disc 1B.

Reference numeral 39 in FIG. 1 is an RF amplifier that is supplied a detected output signal from the photo detector of the optical pickup 4. Given the signal from the photodetector of the optical pickup 4, the RF amplifier 39 generates an RF signal that constitutes the reproduced signal from the optical disc 1B. Where the optical disc 1B is a magneto-optical disc, the RF amplifier 39 outputs an RF signal representing the difference in Kerr rotation angle of the light beam reflected by the recording layer of the optical disc 1B. The RF signal is sent to the EFM/CIRC encoder-decoder circuit 37. Upon receipt of the signal output from the photo detector, the RF amplifier 39 generates a focusing error signal based on astigmatism. In addition, the RF amplifier 39 generates a tracking error signal from the output of the photodetector by use of the so-called three-spot method. Using the push-pull method, the RF amplifier 39 generates a push-pull signal, i.e., a signal reflecting the wobbled pre-grooves detected, and feeds that signal to an address decoder, to be described later. The focusing error signal and tracking error signal are sent to the servo control circuit 5 as described. From the RF signal thus generated, the RF amplifier 39 extracts a clock component and supplies the servo control circuit 5 therewith. In turn, the servo control circuit 5 compares the extracted clock component with a reference clock signal to generate a spindle servo signal. The spindle servo signal is fed to the spindle motor 2. As a result, the spindle motor 2 is controlled so as to rotate the disc at a constant linear velocity. For example, U.S. Pat. No. 4,023,033 describes a generating method of a focusing error signal based on the astigmatism. U.S. Pat. No. 3,876,842 describes a generating method of a tracking error signal using the three-spots method. U.S. Pat. No. 3,909,608 describes a generating method of a push-pull signal using the push-pull method.

Reference numeral 40 in FIG. 1 is an address decoder that is supplied with the push-pull signal from the RF amplifier 39. The address decoder frequency-demodulates the supplied push-pull signal to generate address data. After demodulation by the address decoder 40, the address data is supplied to the EFM/CIRC encoder-decoder circuit 37 for decoding. After decoding, the address information is sent to the system controller 20. Using the address information received, the system controller 20 recognizes and controls the recording or reproducing position on the optical disc 1B during recording or reproducing operation.

Reference numeral 41 in FIG. 1 is a D/A (digital to analog) converter. The digital data read from the optical disc 1B is decompressed by the audio compression encoder-decoder circuit 33. The digital data thus decompressed is converted by the D/A converter 41 to an analog signal. After conversion to analog format by the D/A converter 41, the analog signal is output from an output terminal 42. Reference numeral 60 in FIG. 2 is an opening at the front panel of the disc recording and reproducing apparatus. Through the opening 60, the optical disc cartridge 1 is loaded into the apparatus and ejected therefrom.

For recording, the disc operating and reproducing apparatus of the above-described constitution works as follows: an analog audio signal input through the input terminal 31 is first converted by the A/D converter 32 to a 16-bit digital audio signal. The digital audio signal is compressed by the audio compression encoder-decoder circuit 33 and stored temporarily in the buffer memory 35 via the memory controller 34. From the buffer memory 35, the digital data is read out by the memory controller 34 for output to the encoder-decoder circuit 36. The encoder-decoder circuit 36 converts the received data into sector structure digital data which in turn is fed to the EFM/CIRC encoder-decoder circuit 37. The EFM/CIRC encoder-decoder circuit 37 converts the received data into record data for output to the magnetic head 3 via the head driving circuit 38. The magnetic head 3 applies to the optical disc 1B a vertical magnetic field that is modulated in accordance with the record data received. At this point, the optical pickup 4 emits a light beam at a output power level high enough to record the data onto the optical disc 1B, the light beam being applied form the disc substrate side. As a result, the recording layer of the optical disc 1B is heated to a temperature higher than the Curie point by the light beam from the optical pickup 4 while being subjected simultaneously to the vertical magnetic field from the magnetic head 3. Thereafter, a relative movement of the light beam over the optical disc 1B allows the temperature of the recording layer to drop below the Curie point. This determines the direction of magnetization of the recording layer along the vertical magnetic field applied by the magnetic head 3 to the optical disc 1B, whereby data is recorded on the disc. In the manner described, the data equivalent to about 2 minutes of the original analog audio signal (i.e., 1 cluster) is recorded in about 0.4 seconds to the optical disc 1B.

For reproduction, the disc recording and reproducing apparatus works as follows: loading the optical disc 1B loaded into the apparatus starts rotating the spindle motor 2 and triggers focusing servo and tracking servo retracting operations. The retracting operations are followed by the optical pickup 4 reading the index information from the optical disc 1B. The index information thus read out is stored in an appropriate memory area of the system controller 20 or of the buffer memory 35. Then the optical pickup 4 is moved to the recording area of the optical disc 1B to read data therefrom.

The output signal from the photodetector of the optical pickup 4 is supplied to the RF amplifier 39. The RF amplifier 39 generates the RF signal and various error signals at the same time. These generated error signals are supplied to the servo control circuit 5 which in turn generates various servo signals for focusing and tracking servo control. The RF signal is sent to the EFM/CIRC encoder-decoder circuit 37 for EFM demodulation and error correction. Concurrently, the address decoder 40 feeds address data to the EFM/CIRC encoder-decoder 37 which outputs decoded address information. The address information is supplied to the system controller 20 for control of the reproducing position of the optical pickup 4 in the radial direction over the disc. In addition, the system controller 20 controls the scanning position of the optical pickup 4 over the recording tracks using the sector-based address information extracted from the reproduced digital data.

The digital data from the EFM/CIRC encoder-decoder circuit 37 is sent to the sector structure data encoder-decoder circuit 36. After being decoded from its CD-ROM sector format, the digital data is outputted by the EFM/CIRC encoder-decoder circuit 37 and stored temporarily into the buffer memory 35 via the memory controller 34. Unless there occurs a track jump because of vibration or like disturbance during reproduction, the memory controller 34 reads successively the data from the encoder-decoder circuit 36 at a transfer rate of 1.41 Mbits/sec and writes the read data to the buffer memory 35. The data stored in the buffer memory 35 is read therefrom at a transfer rate of 0.3 Mbit/sec for transfer to the audio compression encoder-decoder circuit 33. In this case, the memory controller 34 controls the writing and reading of data to and from the buffer memory 35 in such a manner that the quantity of data held in the memory 35 will not drop below a predetermined level.

If a track jump is detected during reproduction, the memory controller 34 stops the writing of data from the data encoder-decoder 36 to the buffer memory 35 and carries out only data transfer to the audio compression encoder-decoder 33. After correction of the reproducing position, i.e., the position to which the light beam is applied from the optical pickup 4, the memory controller 34 resumes the writing of data from the encoder-decoder circuit 36 to the buffer memory 35.

During normal reproduction, the memory controller 34 provides memory control such that the buffer memory 35 retains at least a predetermined quantity of data at all times. For example, if the quantity of data in the buffer memory 35 drops below the predetermined minimum level, the memory controller 34 sends a control signal to the system controller 20 have the optical pickup 4 retrieve data intermittently from the optical disc 1B. The intermittently retrieved data is written to the buffer memory 35 by the data encoder-decoder circuit 36 so that a minimum quantity of data is held in the memory 35 all the time.

It takes about 0.9 seconds to fill the entire buffer memory 35 with data. The data thus read is equivalent to about 3 seconds of the original analog audio signal. In other words, if the buffer memory 35 is full of data, the reproduced signal may be kept output for about 3 seconds with no signal read from the optical disc 1B. During that time, the optical pickup 4 is set again to the correct position for another attempt to read the signal therefrom. This is how the adverse effects of the track jump are prevented.

After data decompression by the audio compression encoder-decoder circuit 33, the digital signal is fed to the D/A converter 41 for conversion back to the analog signal. This analog signal is output from the output terminal 42.

On the above-described disc recording and reproducing apparatus of FIG. 1, pushing the record key 16 selects the recording mode. There are two kinds of recording modes available: a normal recording mode in which the audio signal is recorded to the optical disc 1B starting from the moment the record key 16 is pressed, and a prerecording mode in which pushing the record key 16 causes the audio signal to be recorded starting from a point in time earlier than the present time, the prerecording time being set on the variable input part 50. To enter prerecording mode requires operating the prerecord key 19 before the record key 16.

Below is a description of the normal recording mode. When the record key 16 is pushed without the preceding operation of the prerecord key 19, the normal recording mode is selected. In this mode, pushing the record key 16 refreshes the buffer memory 35 and starts digitizing the analog audio signal input from the A/D converter 32. After conversion to digital format, the input signal is subjected to data compression by the audio compression encoder-decoder circuit 33. The compressed digital data is stored consecutively into the buffer memory 35 via the memory controller 34.

The data in the buffer memory 35 is then read out successively one cluster at a time under memory control of the memory controller 34 as described. The data thus read out is converted to sector structure data format and subjected to EFM and error correction coding before being recorded onto the optical disc 1B.

What follows is a description of the prerecording mode. To select the prerecording mode requires pushing the prerecord key 19 before operation of the record key 16. Pushing the prerecord key 19 causes the disc recording and reproducing apparatus to enter a routine 100 shown in FIG. 3. Initially, the buffer memory 35 is refreshed (step 101). The compressed audio data from the audio compression encoder-decoder circuit 33 is then written to the buffer memory 35 successively (step 102).

Figure 4A:
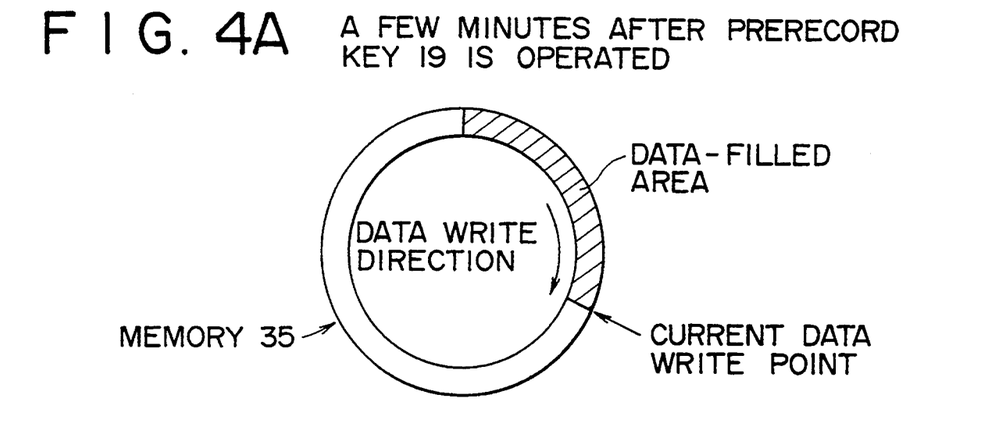
FIG. 4A is a view showing how data is written to the memory when prerecording mode is set.
Figure 4B:
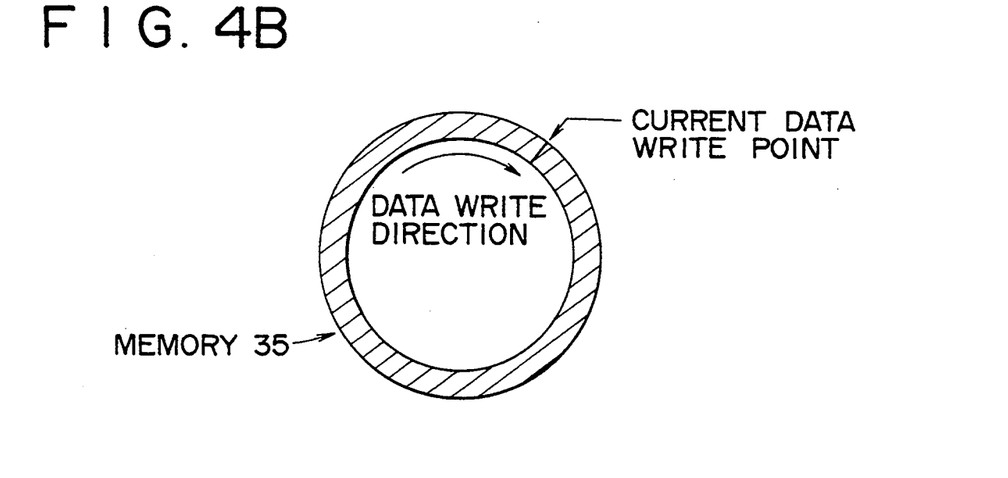
FIG. 4B is a view depicting how data is overwritten to the memory.
Figure 4C:
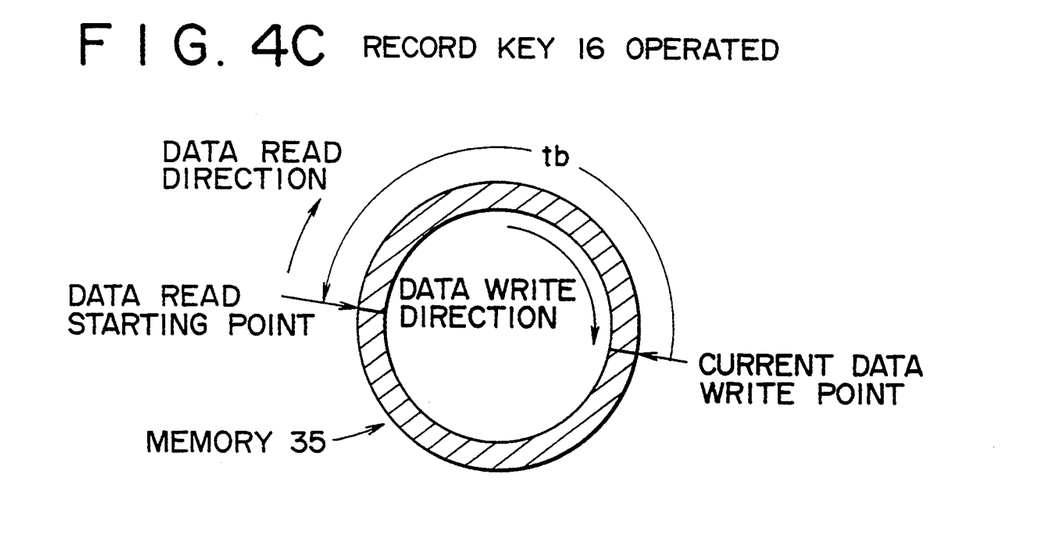
FIG. 4C is a view portraying how data is read from the memory when prerecording mode is set.

In the above setup, the buffer memory 35 provides a preceding data write area excluding an idle area and some memory areas reserved for other data. With respect to the preceding data write area, the buffer memory 35 acts as a so-called ring buffer. FIG. 4A schematically shows how data is written on and read from the buffer memory 35 in the prerecording mode. FIGS. 4A through 4C illustrate a ring-shaped memory area of the buffer memory 35.

Pushing the prerecord key 19 starts the writing of compressed audio data to the buffer memory 35, as depicted in FIG. 4A. In FIGS. 4A through 4C, the shaded portions represent a memory area where data has been written. After the consecutive writing of compressed audio data to the buffer memory 35 has filled its preceding data write area with the written data, new data is overwritten onto the oldest data and onward, as illustrated in FIG. 4B.

In this manner, the buffer memory 35 is always filled with the compressed audio data in effect from a given preceding point in time up to the present time. The writing of compressed audio data to the preceding data write area of the buffer memory 35 acting as a ring buffer continues until the record key 16 is pushed. Eventually pushing the record key 16 causes the preceding data to be recorded onto the optical disc 1B before normal recording mode is entered.

Figure 3:
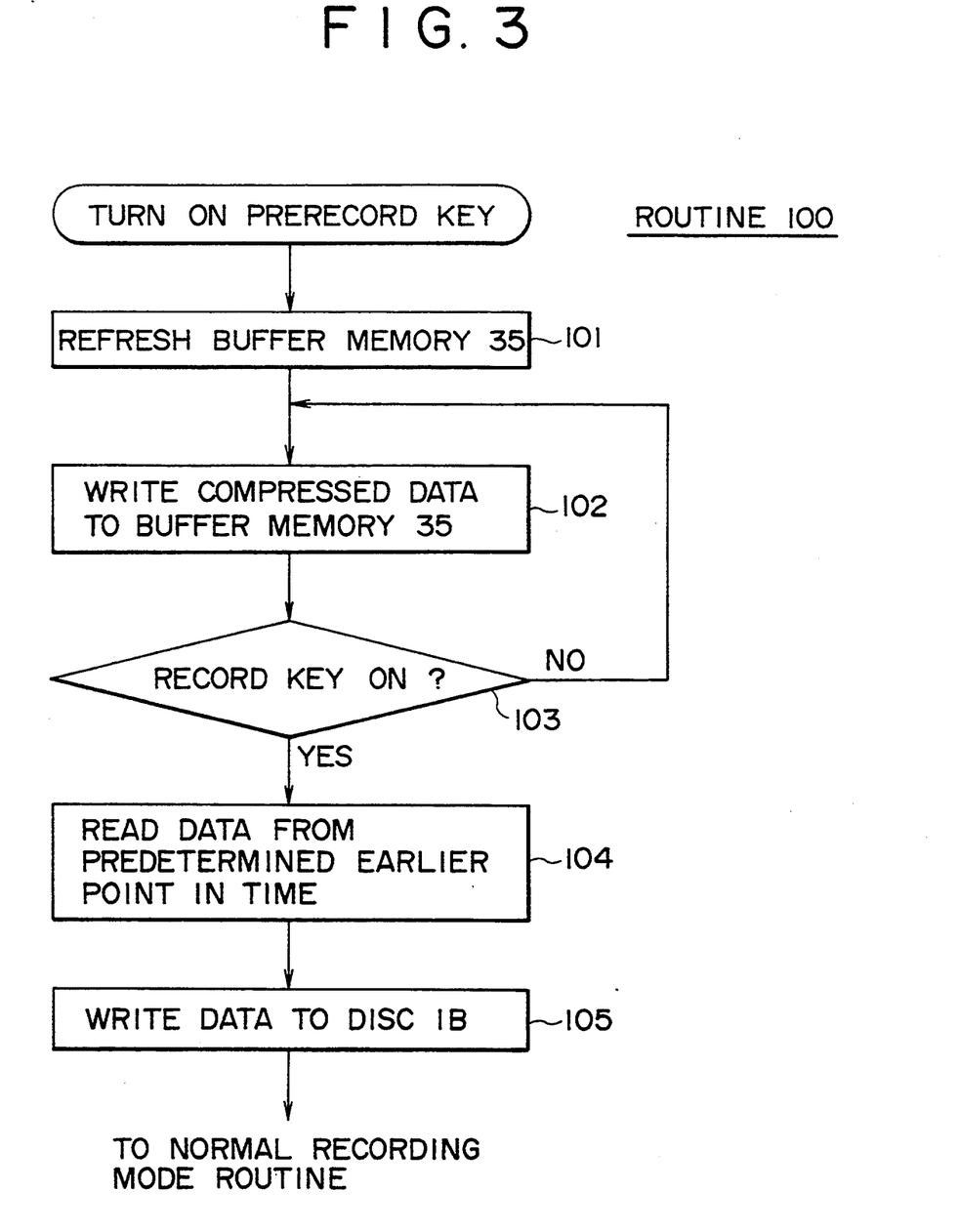
FIG. 3 is a flowchart of key steps constituting a disc recording method embodying the invention.
Figure 5:
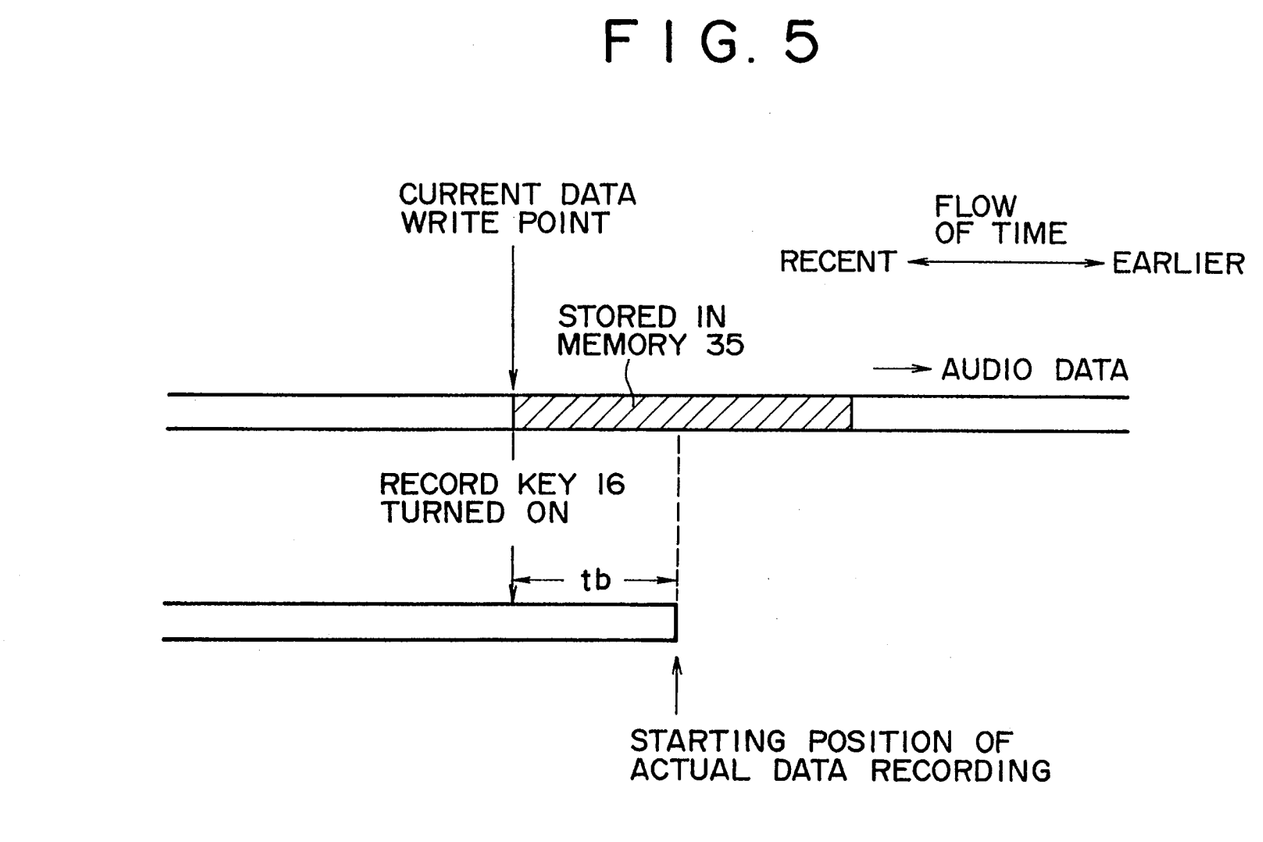
FIG. 5 is a view illustrating the recording operation of the disc recording and reproducing apparatus embodying the invention.

What takes place here is as follows: the operation of the record key 16 is detected in step 103 of the routine 100 in FIG. 3. Step 103 is followed by step 104. In step 104, the data in the buffer memory 35 is read therefrom starting from a point in time earlier by tb-minutes than the present time, the tb-minute prerecording time being preset on the variable input part 50 (FIGS. 4C and 5). Because the data read from the buffer memory 35 is compressed in the above setup, it is faster to read the data from the buffer 35 than to compress the input audio data and write it to the memory 35. As a result, the compressed data continues to be written to the buffer memory 35 even as data is being read therefrom. Under control of the memory controller 34, data is read from the buffer memory 35 at a high speed in units of clusters until the quantity of data therein reaches the predetermined level, as described.

Step 104 is followed by step 105 in which a plurality of clusters of data are recorded onto the optical disc 1B in a relatively short time. Because it takes about 0.4 seconds to record one cluster of data onto the disc, four to five clusters of data may be recorded in about 2 seconds. Thereafter, the normal recording routine takes over.

As described, the buffer memory 35 is used as a ring buffer that can always retain up to its capacity the compressed audio data going back to an earlier point in time than the present time when the record key 16 is pushed. The arrangement allows the data of the preceding period to be recorded before normal recording. This eliminates the possibility of failing to record the initial part of a sound sequence that is desired to be recorded. For example, a listener of radio broadcast may want to verify the contents of the program to be recorded off the radio before actually operating the record key. Pushing the record key after verification of the target program still allows the entire program to be recorded intact. This feature is particularly convenient when it permits a desired prerecording time to be set on the apparatus.

In the disc recording and reproducing apparatus of FIG. 1, the buffer memory 35 is originally provided to compensate for the period of time in which to correct the pickup position dislodged as a result of vibration or other disturbance during recording or reproduction. Because the existing buffer memory 35 may be utilized for the novel feature, there is no need to furnish a separate memory in which to store the data going back to an earlier point in time than the present time when the record key is pushed.

With the above-described embodiment, the prerecord key 19 is operated to determine the preceding point in time at which to start storing data into the buffer memory 35 before the record key is pushed for normal recording. Alternatively, the writing of data to the buffer memory 35 may be started the moment the power switch 11 is turned on. In that case, there is no need to install the prerecord key 19. When normal recording mode is to be selected, the slide rheostat 50 need only be set for a prerecording time of 0 second.

With the disc recording and reproducing apparatus embodied as described, the variable input part on which to set the prerecording time is a slide rheostat. Alternatively, the slide rheostat may be replaced by a rotary rheostat. Another alternative is to replace the rheostat with a plurality of numeric keys constituting the variable input part. These numeric keys are used to enter a value into the system controller which sets the prerecording time accordingly. The prerecording time may be established using any appropriate means other than the slide rheostat or numeric keys.

As many apparently different embodiments of this invention may be made without departing from the spirit and scope thereof, it is to be understood that the invention is not limited to the specific embodiments thereof except as defined in the appended claims.

What is claimed is:

1. A disc recording apparatus comprising:
   an encoder for subjecting an input digital signal to data compression and outputting compressed input data;

a memory for temporarily storing the compressed input data output from the encoder;

a head device for recording data onto a disc; and a controller for controlling the memory and the head device in operation, wherein the controller continually writes compressed input data to the memory at a first speed and, in response to a user supplied record signal, reads out the contents of the memory at a second speed which is higher than the first speed and causes the head device to record the contents read out of the memory, including contents written to the memory a predetermined time before the user supplied record signal is received by the controller, onto the disc.

2. A disc recording apparatus according to claim 1, wherein the controller, after causing the head device to write the contents of the memory onto the disc, overwrites the data stored in the memory with new compressed input data.

3. A disc recording apparatus according to claim 1, further comprising a second encoder for further encoding the contents read out of the memory before recording them on the disc.

4. A disc recording apparatus according to claim 1, wherein the memory is a random access memory.

5. A disc recording apparatus according to claim 1, further comprising:

a first input part for setting a normal recording mode in which only data written to the memory after the user supplied record signal is received by the controller is then read from the memory and recorded on the disc by the head device; and a second input part for setting a prerecording mode in which the controller, in response to a user supplied record signal, reads out the contents of the memory at a second speed which is higher than the first speed and causes the head device to record the contents read out of the memory, including the contents written to the memory a predetermined time before the user supplied record signal is received by the controller, onto the disc; and wherein the first input part and the second input part are connected to the controller.

6. A disc recording apparatus according to claim 1, further comprising user operable variable input means for selectively setting the amount of data, written to the memory a predetermined time before the user supplied record signal is received by the controller, which is to be read out from the memory and recorded by the head device after the controller receives the user supplied record signal.

7. A disc recording apparatus according to claim 6, wherein the user operable variable input means is a slide rheostat.

8. A disc recording apparatus according to claim 6, wherein the user operable variable input means comprises setting means for setting a starting location in the memory from which to start reading out data.

9. A disc recording method comprising the steps of:

subjecting an input digital signal to data compression and outputting compressed input data;

temporarily storing the compressed input data in a memory;

continually writing compressed input data to the memory at a first speed and, in response to a user supplied record signal, reading out the contents of the memory at a second speed which is higher than the first speed and recording the contents read out of the memory, including contents written to the memory a predetermined time before the user supplied record signal is received, onto the disc.

10. A disc recording method according to claim 9, further comprising the step of overwriting the data stored in the memory with new compressed input data after recording the contents of the memory onto the disc.

11. A disc recording method according to claim 9, further comprising the step of choosing between:

setting a normal recording mode in which only data written to the memory after the user supplied record signal is received is then read from the memory and recorded on the disc; and setting a prerecording mode in which, in response to a user supplied record signal, the contents of the memory, including the contents written to the memory a predetermined time before the user supplied record signal is received, are read out at a second speed which is higher than the first speed and recorded onto the disc.

* * * * *